US011230466B2

(12) United States Patent
Bissen et al.

(10) Patent No.: US 11,230,466 B2
(45) Date of Patent: Jan. 25, 2022

(54) BEVERAGE DISPENSER FOR HIGH HYGIENIC REQUIREMENTS

(71) Applicant: RIPRUP Company S.A., St. Peter Port (GG)

(72) Inventors: Monique Bissen, Pforzheim (DE); Josef Schucker, Ronco Sopra Ascona (CH)

(73) Assignee: RIPRUP Company S.A., St. Peter Port (GG)

( * ) Notice: Subject to any disclaimer, the term of this patent is extended or adjusted under 35 U.S.C. 154(b) by 0 days.

(21) Appl. No.: 16/695,507

(22) Filed: Nov. 26, 2019

(65) Prior Publication Data
US 2020/0180934 A1 Jun. 11, 2020

(30) Foreign Application Priority Data

Dec. 7, 2018 (EP) ..................................... 18211135

(51) Int. Cl.
*B67D 1/00* (2006.01)
*B67D 1/07* (2006.01)
*B67D 1/08* (2006.01)
*B67D 1/12* (2006.01)
(Continued)

(52) U.S. Cl.
CPC ............. *B67D 1/07* (2013.01); *B67D 1/0057* (2013.01); *B67D 1/0895* (2013.01);
(Continued)

(58) Field of Classification Search
CPC ...... B67D 1/07; B67D 1/0057; B67D 1/0895; B67D 1/1202; B67D 1/075; C02F 1/04; C02F 1/42; C02F 1/441
(Continued)

(56) References Cited

U.S. PATENT DOCUMENTS 4,171,069 A * 10/1979 Cornelius ............ B67D 1/0864
222/1
5,837,134 A 11/1998 Heskett
(Continued)

FOREIGN PATENT DOCUMENTS

DE 29818213 U1 1/1999
DE 29901306 U1 6/1999
(Continued)

OTHER PUBLICATIONS

European Patent Office: "European Search Report" (EP 18 21 1135); dated Sep. 26, 2019; EPO; Partial Search Report in corresponding European application.
(Continued)

*Primary Examiner* — Vishal Pancholi
(74) *Attorney, Agent, or Firm* — Bryan W. Bockhop; Bockhop Intellectual Property Law, LLC (57) ABSTRACT

A beverage dispenser includes an inlet for drawing a liquid from a source and an outlet for outputting a beverage to a portable user vessel. A demineralization device demineralizes the liquid from the source and has an input and an output. The input of the demineralization device is coupled with the inlet. A beverage preparation device has an input and an output. The input of the beverage preparation device is coupled with the output of the demineralization device and the output of the beverage preparation device is coupled with the outlet. The beverage preparation device, the outlet, all active components and all passive components downstream of the demineralization device contacting the beverage are made of a biological inert material, particularly a biological inert metal, on any surface contacting the water. All couplings of the beverage dispenser are manufactured such that stagnation even of small quantities of beverage is avoided.

10 Claims, 5 Drawing Sheets (51) Int. Cl.
  *C02F 1/04*    (2006.01)
  *C02F 1/42*    (2006.01)
  *C02F 1/44*    (2006.01)

(52) U.S. Cl.
  CPC .............. *B67D 1/1202* (2013.01); *C02F 1/04* (2013.01); *C02F 1/42* (2013.01); *C02F 1/441* (2013.01); *B67D 2001/075* (2013.01); *B67D 2210/0001* (2013.01); *B67D 2210/0002* (2013.01); *B67D 2210/00026* (2013.01); *B67D 2210/00102* (2013.01)

(58) Field of Classification Search
  USPC ....................................................... 222/148
  See application file for complete search history.

(56) References Cited

U.S. PATENT DOCUMENTS

| | | | |
|---|---|---|---|
| 6,689,270 B1* | 2/2004 | Evert | ................... C02F 1/4602 204/248 |
| 2013/0048675 A1 | 2/2013 | Amundson | |
| 2015/0075964 A1* | 3/2015 | Kamen | ................... C02F 1/325 202/180 |
| 2017/0335257 A1 | 11/2017 | Chong et al. | |

FOREIGN PATENT DOCUMENTS

| | | |
|---|---|---|
| FR | 2057279 | 5/1971 |
| FR | 2396367 | 2/1979 |
| WO | 2004058019 A1 | 7/2004 |
| WO | 2010019891 A3 | 2/2010 |
| WO | 2013141253 A1 | 3/2013 |

OTHER PUBLICATIONS

European Patent Office: "Partial European Search Report" (EP 18 21 1135); dated May 31, 2019; EPO; Search Report n corresponding European application.

* cited by examiner

BEVERAGE DISPENSER FOR HIGH HYGIENIC REQUIREMENTS

This application claims the benefit of EP Patent Application No. EP18211135.1, filed Dec. 7, 2018, the entirety of which is hereby incorporated herein by reference.

BACKGROUND OF THE INVENTION

1. Field of the Invention

The present invention relates to a beverage dispenser for fulfilling high hygienic requirements. Particularly, the present invention relates to a beverage dispenser for use in households, restaurants, hotels, offices, hospital, nursing points or the like. The beverage dispenser is adapted for dispensing a beverage into a user vessel such as a glass, a carafe or a portable bottle. Particularly, the present invention relates to a beverage dispenser adapted to dispense beverage by a nozzle for a single person or for small groups of persons into a portable vessel such as a carafe or bottle. Small groups are considered to be formed by 2 to 10 persons. The beverage is output by a nozzle into the user vessel.

2. Description of the Related Art

Beverage dispensers are known to persons skilled in the art. In one type of beverage dispensers a small barrel or a bag, both made of plastics, are inserted into an inlet of a beverage dispenser and beverage from the barrel or bag is output by a nozzle. Some beverage dispensers can provide carbonized water upon request or cool the water upon request. Another type of beverage dispensers is connected to a water source such as tap water. The water is filtered by a sediment filter, an active carbon filter or the like. The water can also be prepared for drinking by ion exchangers and carbonizers.

However, the above described water dispensers suffer the disadvantage that germs are formed within the water dispenser. These germs are difficult to be removed in prior art water dispensers, since the water dispensers are generally made of plastics. Such plastic cannot be heated to a temperature, at which germs and other pathologic microorganisms are killed. Further, prior art water dispensers suffer the disadvantage that water may stagnate in preparation devices, such as tempering devices and carbonizers. Further, water may stagnate in plastic couplings, back taper or the like.

SUMMARY OF THE INVENTION

It is an object of the present invention to provide a beverage dispenser avoiding germ formation in components contacting the beverage.

The object of the present invention is achieved by a beverage dispenser according to claim 1. The depending claims relate to preferred embodiments.

The object of the present invention is achieved by a beverage dispenser comprising an inlet for drawing a liquid from a source, such as a tap or a tank filled with tap water. The beverage dispenser further comprises an outlet for outputting a beverage to a portable user vessel such as a glass, a cup, a portable carafe, a portable bottle or the like. The outlet of the beverage dispenser may be formed by a nozzle. The beverage dispenser further comprises a demineralization device for demineralizing the liquid from the source having an input and an output. The input of the demineralization device is coupled with the inlet of the beverage dispenser. Between the input of the demineralization device and the inlet of the beverage dispenser a sediment filter, an active carbon filter or the like may be coupled. The beverage dispenser further comprises a beverage preparation device having an input and an output. The input of the beverage preparation device is coupled with the output of the demineralization device. The output of the beverage preparation device is coupled with the outlet of the beverage dispenser. A plurality of beverage preparation devices may be arranged serially and/or in parallel.

According to the present invention the beverage preparation device, the outlet, all active components and all passive components downstream of the demineralization device contacting the beverage are made of a biological inert material on any surface contacting the water. The biological inert material may be a biological inert metal. A biological inert material is a material that does not serve as nutrition for germs, pathological microorganisms, a biological film, bacteria, virus or the like. Germs cannot form on biological inert material contrary to plastics.

The beverage dispenser is suited for use by end users. An amount of beverage output by the beverage dispenser is suited for consumption by a single person or a group of up to 10 persons.

The biological inert metal may comprise biological inert steel, glass, ceramic, a silicon dioxide based material (a silicon dioxide based material), stainless steel, VA steel, V1A steel, V2A steel, V3A steel, V4A and/or V5A steel. Such steel is resistant against corrosion when in contact with water and other beverages. Such steel also avoids formation of germs and deposition of biological films on its surface and does not provide any nutrition to germ, microorganisms, bacteria and virus.

The demineralization device of the beverage dispenser may comprise a reverse osmosis filter, an ion exchanger and/or a distiller. The beverage preparation device may comprise a flow-type tempering device adapted for cooling or heating the beverage to a temperature desired by a user. Additionally or alternatively, the beverage preparation device may include a flow-type carbonization device for feeding carbon dioxide into the beverage. Alternatively or additionally, the beverage preparation device may comprise a mineralization device mineralizing the beverage, such as water that is demineralized by the demineralization device.

Since the beverage preparation device are flow-type beverage preparation devices no stagnation occurs downstream of the demineralization device. Thereby, germ formation or deposition of biological films can be further avoided on components contacting the beverage.

The inner diameter of a channel of an input port of at least one of the beverage preparation devices is equal to the inner diameter of the conduit connected to the input port of the beverage preparation device. The inner diameter of a channel of an output port of at least one of the beverage preparation devices is equal to the inner diameter of the conduit connected to the output port of the beverage preparation device. Alternatively, or additionally the inner diameter of a channel of an output port of the demineralization device is equal to the inner diameter of the conduit connected to the output port of the demineralization device.

Thereby, back taper, cavities, dead space or the like, in which beverage may stagnate causing undesired germ formation and/or deposition of a biologic film are prevented.

At least a part of a surface of the conduit contacting the beverage may be electroplated. At least a part of a surface of the beverage preparation device contacting the beverage is electroplated. At least a part of a surface of the demineralization device contacting the beverage is electroplated. By this galvanic step a particularly smooth and even surface is formed having a particularly low roughness. Thereby, germ formation, stagnation and deposition of biological films may be prevented.

At least one conduit may be manufactured by orbital welding. Orbital welding is known for welding conduits. Orbital welding provides a comparably high standard in terms of low roughness of the weld seam. Also thereby, germ formation, stagnation and deposition of biological films are prevented.

At least one conduit may be hard soldered into an opening of a port of the demineralization device. At least one conduit may be hard soldered into an opening of a port of the beverage preparation device.

The beverage dispenser may comprise a thermal disinfection device adapted to heat a liquid to a temperature at which bacteria and/or virus and/or pathogenic microorganisms are killed. The output of the thermal disinfection device is coupled to the input port of at least one beverage preparation device. Preferably, the output of the thermal disinfection device is coupled with the most upstream beverage preparation device downstream of the demineralization device. The temperature of the liquid output by the thermal disinfection device may have a temperature of at least 70° C., more preferred at least 75° C., more preferred at least 80° C., most preferred at least 90° C. This high temperature can ensure that any depositions in the conduits or water preparation devices are removed. Further, any biological material, proteins, bacteria, virus, pathogenic microorganisms or the like are killed and spilled out of the beverage dispenser.

The beverage dispenser may further comprise a chemical disinfection device, wherein the chemical disinfection device is adapted to output a liquid that is adapted to chemically kill bacteria and/or virus and/or pathogenic microorganisms, wherein the output of the chemical disinfection device is coupled to the input of at least one beverage preparation device. Preferably, the output of the chemical disinfection device is coupled with the input of the most upstream beverage preparation device downstream of the liquid demineralization device. The chemical disinfection device may add silver ions, chloride ions, chloride dioxide ions, sodium carbonate, sodium hypochlorite, sodium hydroxide, sodium metasilicate, cocamine oxide, didecyldimethylammonium chloride, ethanol, sodium chloride, sodium hypochloride, sodium chlorite, sodium peroxodisulfate, ozone or the like to water flowing into the least one beverage preparation device.

Since the surfaces contacting the beverage of the beverage preparation device and the surface of the conduit contacting the beverage are made of biological inert metal, hot temperature and effective chemical compounds for cleaning the surfaces contacting the beverage may be used. This is not possible with beverage dispensers of the prior art having plastic surfaces contacting the beverage.

The beverage dispenser may comprise a controller adapted to operate the beverage dispenser in at least two operation modes comprising a beverage dispensing mode as well as a thermal disinfection mode and/or a chemical disinfection mode. In a preferred embodiment the beverage dispenser may be operated by the controller in three operation modes, comprising the beverage dispensing mode, the thermal disinfection mode and the chemical disinfection mode. The controller is adapted to switch in the thermal disinfection mode at least one valve such that liquid passes through the thermal disinfection device and then through at least one beverage preparation device, wherein the thermal disinfection device heats the liquid passing through the thermal disinfection device to a temperature at which bacteria and/or virus and/or pathogenic microorganisms are killed thermally.

The controller is adapted to switch in the chemical disinfection mode at least one valve such that liquid passes through the chemical disinfection device and then through at least one beverage preparation device, wherein the chemical disinfection device is adapted to output the liquid such that the liquid is adapted to chemically kill bacteria and/or virus and/or pathogenic microorganisms. The controller is adapted to control in the beverage dispensing mode the thermal disinfection device such that the liquid is not heated to a temperature at which bacteria and/or virus and/or pathogenic microorganisms are killed and to control the chemical disinfection device such that the chemical disinfection device does not output liquid adapted to kill bacteria and/or virus and/or pathogenic microorganism. Thereby, the controller can ensure that no biological film, germ or the like is coating the conduit or components of beverage preparation elements contacting the beverage.

In one embodiment the thermal disinfection device and chemical disinfection device may be formed by a single device that may perform chemical disinfection and thermal disinfection. It is also possible that the disinfection device can carry out thermal disinfection and chemical disinfection simultaneously by supplying hot water comprising chemical agents.

A seal between a conduit and at least one beverage preparation device and/or the mineralization device may be made of polytetrafluorethylene. In one embodiment the seal may be coated with polytfluoroethylene. Polyfluoroethylene (PTFE) has the advantage that it is chemical inert and biological inert. Thereby, germ formation and deposition of a biologic film can be prevented. Polyflouroethylene is commercially available as Teflon.

In one embodiment the seal may be made of fluororubber also known as flourelastomer and VITON. In one embodiment the seal may be made of fluororubber coated with polytetraflouroethylene.

Fluororubber is biological inert and thus preventing germ formation and deposition of a biologic film.

A conduit coupled with at least one beverage preparation device and/or the demineralization device may comprise a flange extending radially outward from the axial end of the conduit. A channel is formed in a port of the at least one beverage preparation device and/or the demineralization device for piping beverage through the at least one beverage preparation device and/or the demineralization device. A seal is located between the flange and a wall of a housing of the port of the at least one beverage preparation device and/or the demineralization device. The central axis of the channel, the inner surface of the seal and the inner surface of the conduit coincide. The housing of the port may be arranged perpendicular to the central axis of the channel. The inner diameter of the conduit, the seal and the channel of the port comprise the same diameter for preventing stagnation and germ formation. Since the inner diameter of the conduit, the inner diameter of the seal and the inner diameter of the port comprise the same diameter no back taper or cavity is caused in which beverage may stagnate. The seal may be a cylindrical seal.

In one embodiment the seal may be located in a recess of the housing. In one embodiment the seal may be sandwiched between the flange and an outer wall of the port extending perpendicular to the center axis of the channel. The flange only abuts the seal and no other component of the port and/or housing. The other wall may extend perpendicular to the central axis from the outmost edge of the channel.

A conduit coupled with at least one beverage preparation device and/or the demineralization device may comprise a flange extending radially outward from the axial end of the second conduit. A seal between the flange and a wall of a housing at a channel of a port of the at least one beverage preparation device and/or the demineralization device may be located in a recess formed in the flange and/or the housing. The central axis of the channel and the inner surface of the conduit coincide. The inner diameter of the conduit and the port comprise the same diameter. Also thereby, stagnation and germ formation are prevented, since there is no back taper or cavity in which beverage may stagnate.

A port of at least one beverage preparation device and/or the demineralization device comprises a channel comprising a first section having a first diameter, a second section comprising a second diameter and a third section comprising a third diameter. The first diameter is larger than the second diameter and the second diameter is larger than the third diameter. The first section is juxtaposed to the opening of the channel and the second section is located between the first section and the third section. A conduit comprises a flange located spaced apart from an axial end (at the opening) of the conduit, wherein the axial end and the flange of the conduit is inserted into the first section of the port. A seal is located between the flange and a wall formed at the border of the first section and the second section, and the opening of the conduit is located juxtaposed to a wall formed at the border of the second section and third section. The inner diameter of the third section is equal to the inner diameter of the conduit. Thereby, stagnation and germ formation at a coupling between a conduit and a beverage preparation device and/or the demineralization device may be prevented. The seal may be an O-ring.

In one embodiment a port comprising a channel is formed in a housing of at least one beverage preparation device and/or the demineralization device. The channel comprises a first section having a first diameter and a second section having a second diameter, wherein the first diameter is larger than the second diameter. A conduit comprises a flange located spaced apart from the axial end (at which the opening is positioned) of the conduit. The axial end (opening) and the flange of the conduit is inserted into the first section of the port. A seal is located between the flange of the conduit and a border section between the first section and second section. The inner diameter of the second section of the channel is equal to the inner diameter of the conduit for preventing cavities and back taper in which stagnation, deposition of a biologic film and germ formation may occur. The central axis of the second section and the central axis of the inner surface of the conduit coincide. The seal may be a O-ring or cylindrical seal.

In one embodiment, at least one conduit may be connected to a port having a channel of at least one beverage preparation device and/or the demineralization device by a compression fitting. The inner diameter of the channel is equal to the inner diameter of the at least one conduit for preventing stagnation, cavities and back taper. The center axis of the channel and the center axis of the conduit coincide.

In one embodiment the beverage dispenser may comprise a pump causing a flow of liquid from the inlet to the outlet. The beverage dispenser may further comprise a controller controlling the pump and at least one beverage preparation device. The controller controls the pump after a request of a user to dispense beverage such that in all beverage preparation devices an equal flow rate is achieved. Thereby, stagnation and germ formation as well as deposition of biological films are prevented. In prior art beverage dispensers some components comprise tanks for preparing the beverage. For example, a cooling device may comprise a tank in which stagnating water is cooled. Also, a prior art carbonization device may comprise a tank in which water is stagnating and added with carbon dioxide. Such stagnation is undesired, as described above.

In one embodiment germ formation due to stagnation may be prevented by causing a forced flow of beverage through the demineralization device and at least one of the beverage preparation devices, if no user request for dispensing beverage was received for a predetermined period of time. The predetermined period of time may be 3 to 6 hours. In one embodiment the beverage (water) output by the drain during the forced flow can be recirculated to the source for reducing water consumption during forced flow.

A beverage preparation device according to the present invention may also be a valve or a pump or any other device for preparing or for switching the flow of beverage.

According to the present invention, the beverage comprises an equal flow rate in all beverage preparation devices in order to avoid stagnation.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1:
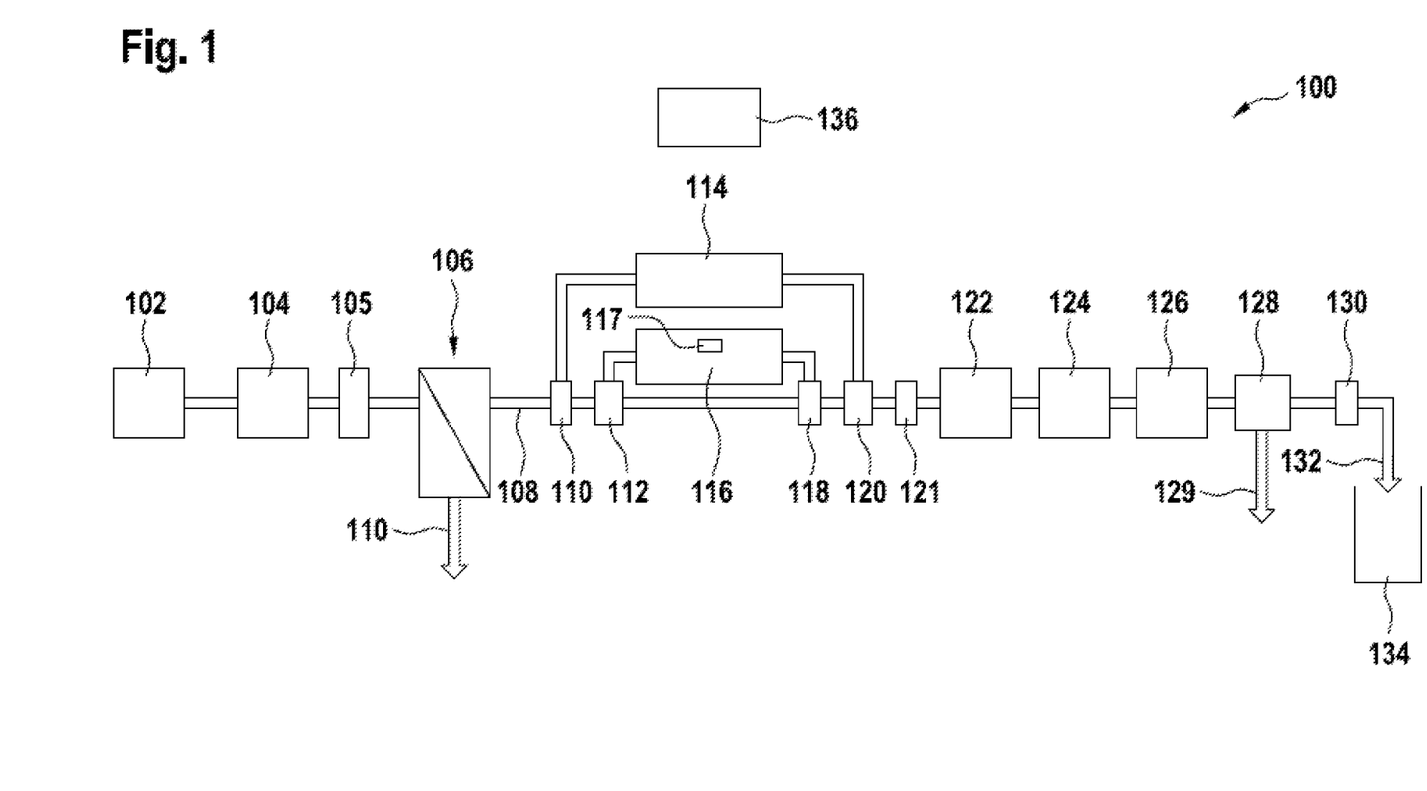
FIG. 1 shows a schematic overview of a water dispenser according to the present invention.

Reference is made to FIG. 1 showing a beverage dispenser 100 according to the present invention which is explained with reference to a water dispenser 100. The water dispenser 100 is connected to a water source 102 that may be tap water or a tank.

The water source 102 is connected by a conduit with a pre-filter 104 which may comprise a sediment filter and/or an active carbon filter.

The pre-filter 104 is connected to a reverse osmosis filter 106 acting as demineralization device. The water drawn from the water source 102 is pressurized by a pump 105 before entering the reverse osmosis filter. Operation of a reverse osmosis filter 106 is known to the person skilled in the art, and therefore operation of the reverse osmosis filter 106 does not have to be explained in further detail. The concentrate in which the undesired components, such as minerals, heavy metals or the like are solved, as well as filtered microorganisms are output to a drain 110.

The permeate, which is formed by demineralized water is output to a conduit coupled to a first valve 110. In normal operation the first valve 110 is switched such that the water is fed into a second valve 112, which is in normal operation switched such that the water is fed to a third valve 118. In normal operation the third valve 118 and a fourth valve 120 are switched such that the water (permeate) output by the reverse osmosis filter 106 is fed to a flow-type tempering device 122 forming a beverage preparation device. The flow-tempering device is tempering the water to a temperature set by a controller 136. The water flows from an output of the flow-type tempering device to the input of a flow-type carbonization device 124 adding carbon dioxide to the water as set by a controller 136.

From an output of the flow-type carbonization device 124 forming also a beverage preparation device, the water flows to a flow-type mineralization device 126 also forming a beverage preparation device. The controller 136 controls the mineralization device 126 such that the water output by the flow-type mineralization device comprises the minerals desired by a user. The flow-type mineralization device 126 may comprise a plurality of vessels filled with mineralization fluid, wherein a plurality of micro metering pumps delivers the mineralization fluids in the respective desired quantity into the water flowing through an input of the flow-type mineralization device 126 to an output of the flow-type mineralization device 126. Such flow-type mineralization device is for example disclosed in the European patent application EP18207971.5 which is incorporated herein by reference. The water flows from the output of the flow-type mineralization device 126 to a fifth valve 128 and passes through a retrograde contamination prevention device 130, before it is output by a nozzle to a portable user vessel 134. The portable user vessel 134 may be a glass, a cup, a bottle, a carafe or the like. The portable user vessel 134 may be suitable for carrying beverage for a single person or a small group of persons, such as 2 to 10 persons.

The first valve 110, the second valve 112, the third valve 118, the fourth valve 120 and the fifth valve 130 are controlled by the controller 136. In normal operation the water flows from the permeate output of the reverse osmosis filter 106 through the first valve 110, the second valve 112, the third valve 118, the fourth valve 120, the flow-type tempering device 112, the carbonization device 124, the flow-type mineralization device 126, the fifth valve 128 and the retrograde contamination prevention device 130 through the nozzle 132 into the user vessel 134. The normal operation is the beverage dispensing operation mode. All components of conduits, of the first valve 110, the second valve 112, the third valve 118, the fourth valve 120, the flow-type tempering device 122, the flow-type carbonization device 124, the flow-type mineralization device 126, the fifth valve 128, the retrograde contamination prevention device 130 and the nozzle 132 are made of metal that is biological inert. Also, the output port for permeate of the reverse osmosis filter 106 is made of biological inert material, particularly a biological inert metal. The biological inert metal may comprise stainless steel, VA steel, VA1 steel, VA2 steel, VA3 steel, VA4 steel or the like. A biological inert material is a material that does not serve as nutrition for germs, pathological microorganisms, a biological film, bacteria, virus or the like. Germs cannot form on biological inert metal contrary to plastics. Thereby, germ formation and deposition of biological films are prevented.

As will be described in further detail with reference to FIGS. 2 to 7, no back taper and no cavity can be found within the conduits, valves and beverage preparation devices. Thereby, germ formation, spreading of bacteria, spreading of virus and/or pathogenic microorganisms may be prevented.

In the beverage dispensing operation mode, the controller controls the pump 105 after a request of a user to dispense beverage such that in all beverage preparation devices 122, 124, 126 an equal flow rate is achieved. Thereby, stagnation and germ formation as well as deposition of biological films are prevented. In prior art beverage dispensers some components comprise tanks for preparing the beverage. For example, a prior art cooling device may comprise a tank in which stagnating water is cooled. Also, a prior art carbonization device may comprise a tank in which water is stagnating and added with carbon dioxide. Such stagnation is undesired, as described above.

According to the present invention, the beverage comprises an equal flow rate in all beverage preparation devices in order to avoid stagnation. The flow rate may be monitored by a flow sensor 121.

The beverage dispenser 100 further comprises a thermal disinfection device 114 connected to the controller and a chemical disinfection device 116 connected to the controller 136. In a thermal disinfection mode, the controller 136 switches the first valve 110 such that water flows from the conduit 108 into the thermal disinfection device, and the fourth valve 120 such that water flows from the thermal disinfection device 114 to the flow-type tempering device 122, to the flow-type carbonization device 124 and the flow-type mineralization device 126. A fifth valve 128 is switched by the controller 136 in the thermal disinfection mode such that the water flows to a drain 129, where it is discarded.

The thermal disinfection device 114 heats the water to a temperature in which bacteria, virus and/or pathogenic microorganisms are killed. The temperature may be at least 80°, preferably at least 90°, more preferred at least 95°. Since surfaces contacting the water (beverage) are formed of metal, the surfaces can be heated up to a temperature at which bacteria, virus and pathogenic microorganisms are killed. This is impossible with prior art beverage dispenser comprising plastic surfaces contacting the beverage.

The present invention has the advantage that reliable disinfection can be carried out after an appropriate time span without jeopardizing the long-term functionality of the beverage dispenser.

The water dispenser 100 further comprises a chemical disinfection device 116 controlled by the controller. The chemical disinfection device 116 comprises an opening 117 in which a cleaning agent may be inserted, such as a liquid or a solid material. The disinfection agent may comprise silver ions, chloride ions, chloride dioxide ions, sodium carbonate, sodium hypochlorite, sodium hydroxide, sodium metasilicate, cocamine oxide, didecyldimethylammonium chloride, ethanol, sodium chloride, sodium hypochloride, sodium chlorite, sodium peroxodisulfate, ozone. The disinfection agent may be suitable to kill bacteria, virus and/or pathogenic microorganisms.

In the chemical disinfection mode, the controller 136 controls the first valve 110 and the second valve 112 such that water flows from the permeate output of the reverse osmosis filter 106 to the chemical disinfection device 116, in which the disinfection agent is supplemented to the water. The controller controls the third valve 118 and the fourth valve 120 such that water flows from the chemical disinfection device 116 to the flow-type tempering device 122, the flow-type carbonization device 124 and the flow-type mineralization device 126. From the output of the flow-type mineralization device the water flows to the fifth valve 128, which is switched such that the water flows to a drain 129, where it is discarded.

Since all surfaces of the conduits contacting the water and all surfaces of the beverage preparation devices 112, 124, 126 contacting the water and all surfaces of the valves 110, 112, 118, 120 and 128 are made of metal, which is chemically comparably inert, the surfaces are not attacked by the chemical disinfection fluid, contrary to prior art devices in which many surfaces contacting water and beverage are formed of plastic. Thereby, a reliable chemical disinfection may be achieved that does not reduce life expectancy of the water dispenser 100.

In one embodiment the thermal disinfection device 114 and chemical disinfection device 116 may be formed by a single device that may perform chemical disinfection and thermal disinfection. It is also possible that the disinfection device can carry out thermal disinfection and chemical disinfection simultaneously by supplying hot water comprising chemical agents.

In one embodiment germ formation due to stagnation may be prevented by causing a forced flow of beverage through the demineralization device 106 and at least one of the beverage preparation devices 122, 124, 126, if no user request for dispensing beverage was received for a predetermined period of time. The predetermined period of time may be 3 to 6 hours. In one embodiment the water output by the drain 129 during forced flow can be recirculated to the source 102 for reducing water consumption during forced flow.

Figure 2:
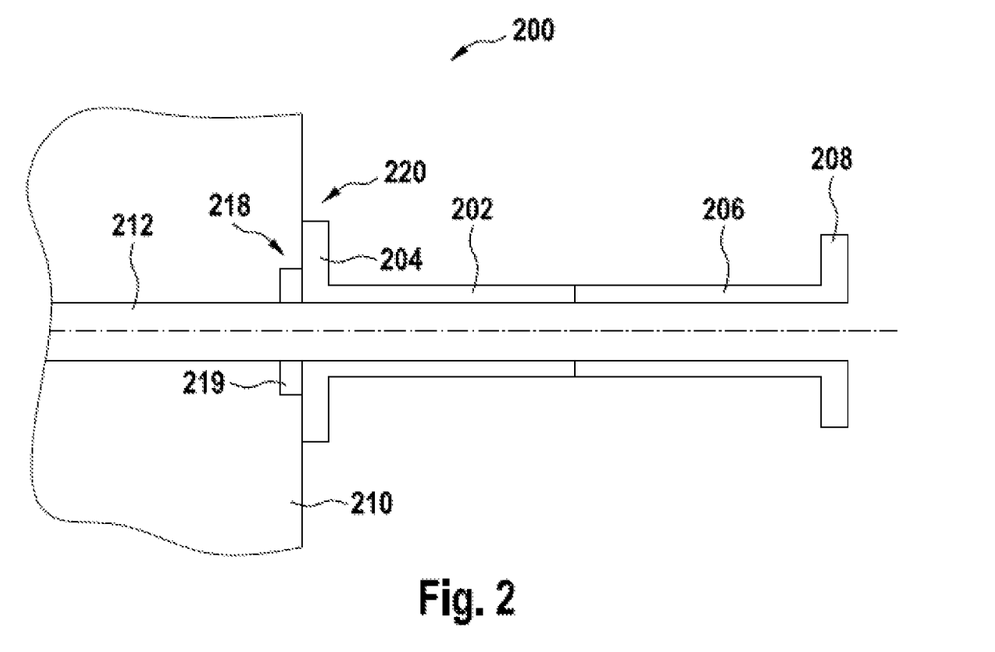
FIG. 2 shows a first embodiment of a coupling between a conduit and a beverage preparation device and/or a demineralization device.

Reference is made to FIG. 2 showing a first embodiment of a coupling between a conduit 202 and a water preparation device 210 or a demineralization device 210. The conduit 202 comprises at its axial end a flange 204 extending from the axial end of the conduit 202 in radial direction. The flange 204 may be fastened to a port 220 of the beverage preparation device 210 or the demineralization device 210.

The port 220 further comprises a channel 212 in which beverage can flow into or out of the beverage preparation device 210 or out of the demineralization device 210. In the channel a recess 218 is formed in which a seal 219 is arranged. The seal 219 contacts the flange 204 and the recess 218.

The inner diameter of the conduit 202 and the inner diameter of the seal 219 and the inner diameter of the channel 212 are equal. The central axis of the channel 212, and the central axis of the inner surface of the seal 219 and the central axis of the inner surface of the conduit 202 coincide. Thereby, a smooth surface is generated at the coupling 200 of the conduit 202 with the channel 212. The surface at the coupling 200 does not have any back taper or cavity or the like in a portion where beverage flows. Thereby, stagnation of beverage may be prevented avoiding germ formation, formation of biological films or the like. The flange 204 may be fixed to the port 220 by a screw (not shown).

To the conduit 202 a complementary conduit 206 may be connected such that the conduit 202, 206 comprises a flange 204, 208 at both sides. The conduit 202, 206 may be connected by orbital welding. The inner surface of the conduit 202, 206 may be electroplated for smoothing the surface for avoiding stagnating of water. Further, the inner surface of the channel 212 may be electroplated for reducing surface roughness and stagnation of water.

Figure 3:
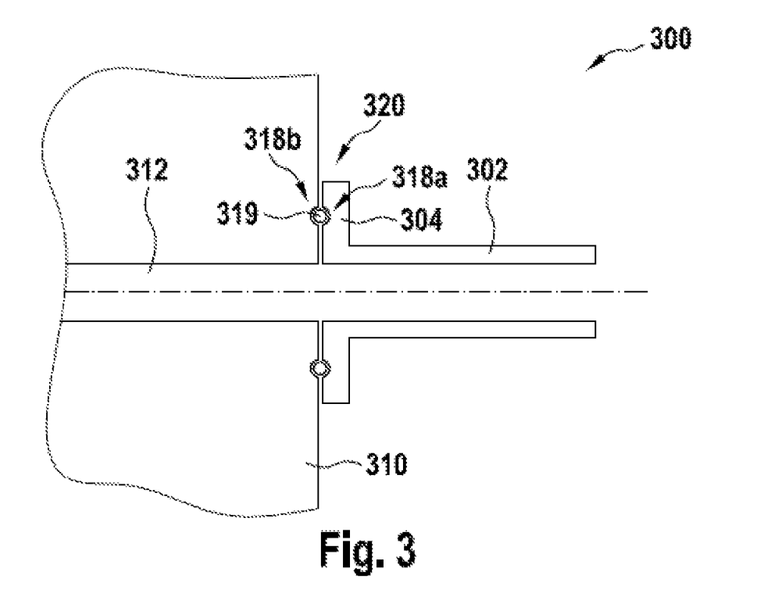
FIG. 3 shows a second embodiment of a coupling between a conduit and a beverage preparation device and/or a demineralization device.

Reference is made to FIG. 3 showing a second embodiment of a coupling 300 according to the present invention essentially corresponding to the first embodiment. A conduit 302 comprises a flange 304 at its axial end (where the opening is located), wherein the flange 304 extends in axial direction of the conduit 302. At the beverage preparation device 310 and/or the demineralization device 310 a port 320 is formed. The port 320 comprises a channel 312 for piping beverage into and/or out of the beverage preparation device 310 or for piping beverage out of the demineralization device 310. The central axis of the channel 312 and the central axis of the inner surface of the conduit 302 coincide. The inner diameter of the channel 312 is equal to the inner diameter of the conduit 302.

A seal 319, embodied for example by an O-ring is located in a circular recess 318a formed in the flange 304 and/or in a circular recess 318b formed in the port. The circular recess 318a, 318b may be formed centrical to the central axis of the channel 312 and the conduit 302. In one embodiment a single recess may be formed in the flange 304 or a single recess may be formed in the housing/port 310, 320.

The flange 304 may be fixed to the port 320 by a screw (not shown).

Also, the second embodiment provides a coupling 300 without back taper and cavities for avoiding stagnation of beverage and thereby germ formation and formation of biological films.

The inner surface of the conduit 302 and/or the inner surface of the channel 312 may be smoothed by electroplating. The conduit 302 may be extended by another conduit (not shown) by orbital welding, as has been explained before with reference to the first embodiment shown in FIG. 2.

Figure 4:
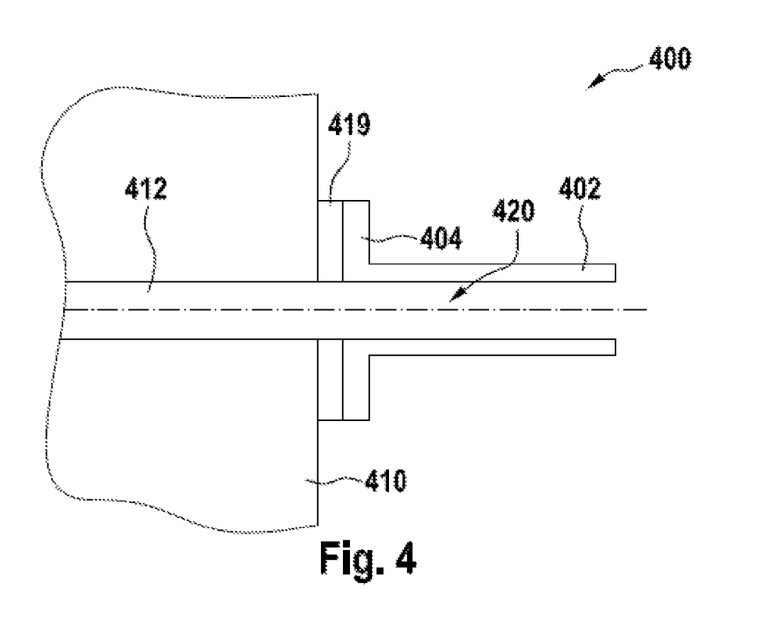
FIG. 4 shows a third embodiment of a coupling between a conduit and a beverage preparation device and/or a demineralization device.

Reference is made to FIG. 4 showing a third embodiment of a coupling 400 according to the present invention essentially corresponding to the first embodiment. A conduit 402 comprises a flange 404 at its axial end (where the opening is located), wherein the flange 404 extends in axial direction of the conduit 402. At the beverage preparation device 410 and/or the demineralization device 410 a port 420 is formed. The port 420 comprises a channel 412 for piping beverage into and/or out of the beverage preparation device 410 or for piping beverage out of the demineralization device 410.

A seal 419 embodied for example by a cylindrical seal is located abutting an outer wall of the port 419, wherein the outer wall extends from an outer edge of the channel 412. The outer wall of the port 419 may be perpendicular to the central axis of the channel 412. The outer edge of the channel may be the orifice of the channel at the housing or port 420 of the beverage preparation device 410 and/or the demineralization device 410. The flange 404 abuts the seal 419 at the side that is located opposite to the outer wall of the port 420. In other words, the seal 419 is sandwiched between the outer wall of the port 420 and the flange of the conduit 402.

The central axis of the channel 412, the central axis of the seal 419 and the central axis of the inner surface of the conduit 402 coincide. The inner diameter of the channel 412 is equal to the inner diameter of the conduit 402 and to the inner diameter of the seal 419. The flange 404 may be fixed to the port 420 by a screw (not shown).

Also, the third embodiment provides a coupling 400 without back taper and cavities for avoiding stagnation of beverage and thereby avoiding germ formation and formation of biological films.

The inner surface of the conduit 402 and/or the inner surface of the channel 412 may be smoothed by electroplating. The conduit 402 may be extended by another conduit (not shown) by orbital welding, as has been explained before with reference to the first embodiment shown in FIG. 2.

Figure 5:
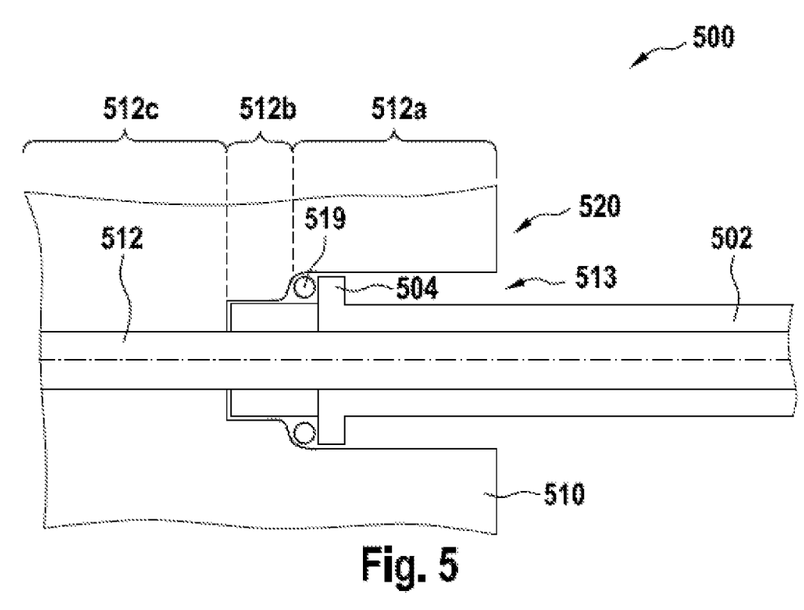
FIG. 5 shows a fourth embodiment of a coupling between a conduit and a beverage preparation device and/or a demineralization device.

Reference is made to FIG. 5 showing a fourth embodiment of a coupling according to the present invention. A conduit 502 comprises a flange 504 extending in radially outward direction of the conduit 502 at a position that is spaced apart from the axial end of the conduit 502. At the axial end of the conduit 502 the opening is formed. The opening of the flange 504 is positioned in a channel 512 of a port 520 of the beverage preparation device 510 or demineralization device 510. In the channel 512 beverage is piped into or out of the beverage preparation device 510 or piped out of the demineralization device 510. The channel 512 comprises a first section 512*a* having a first diameter, a second section 512*b* having a second diameter and a third section 512*c* having a third diameter. The first section 512*a* is juxtaposed to the opening 513 of the channel 512. The second section 512*b* is located between the first section 512*a* and third section 512*b*. The third section is spaced apart further from the opening 513 as the first section 512*a* and the second section 512*b*.

The conduit 502 is inserted into the channel 512 such that the axially end (opening) of the conduit is located juxtaposed to a wall formed at the border of the second section 512*b* and third section 512*c* of the channel 512. The flange 504 of the conduit 502 is also inserted into the channel and is located at the first section. The flange 504 passes in axial direction of the conduit 502 against a seal 519 located at the transition (border) between the first section 512*a* and second section 512*b* of the channel 512.

The center axis of the channel 512 coincides with the center axis of the inner surface of the conduit 502. The inner diameter of the channel 512 is equal to the inner diameter of the conduit 502. Thereby, back taper and cavities, in which beverage may stagnate are avoided and germ formation and formation of biological films are prevented.

In the first section 512*a* an inner threat may be formed. An outer thread nut may be arranged axially movable on the outer surface of the conduit 502. The outer thread nut may have an outer threat engaging with the inner threat of the first section 512*a* of the channel. The outer thread nut may press the flange 504 against the seal 518 for fastening the conduit 502 at the port 520.

The channel 512 and the inner surface 502 may be electroplated. A complementary conduit may be connected to the conduit 502 by orbital welding as has been described before with respect to the first embodiment shown in FIG. 2.

Figure 6:
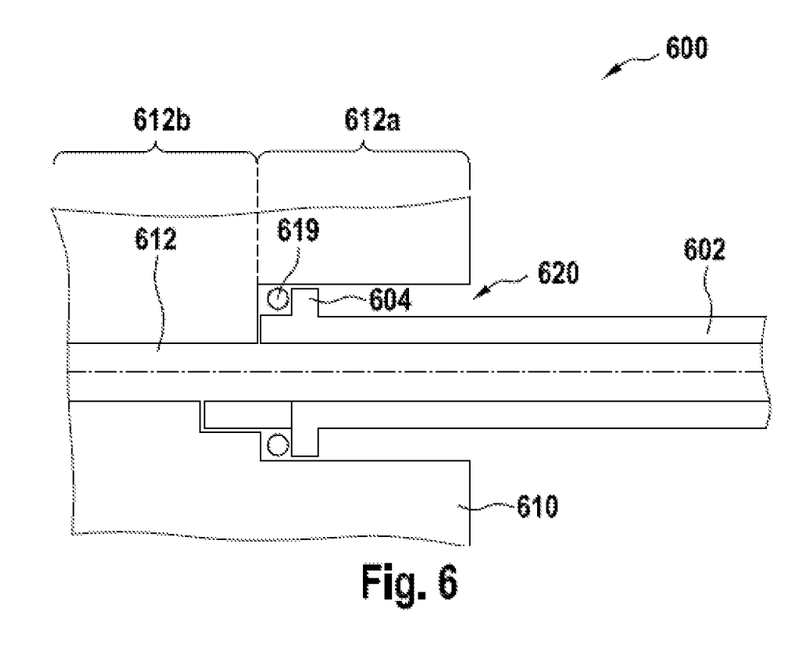
FIG. 6 is a fifth embodiment of a coupling between a conduit and a beverage preparation device and/or a demineralization device.

Reference is made to FIG. 6 showing a fifth embodiment of the coupling 600 between a conduit 602 and a beverage preparation device 610 or a demineralization device 610. The conduit 602 comprises a flange 604 that is located spaced apart from the axial end of the conduit 602. The opening of the conduit 602 is located at the axial end of the conduit 602.

The beverage preparation device 610 or the demineralization device 610 comprises a port 620 comprising a conduit having a first section 612*a* comprising a first diameter and a second section 612*b* comprising a second diameter. The first diameter is larger than the second diameter. The axial end of the conduit 602 and the flange extending radially outward of the conduit 602 are located within the first section 612*a* of the channel. The axial end of the conduit 602 abuts the border between the first section 612*a* and second section 612*b*. The channel 612 is adapted for piping beverage into the conduit 602 or from the conduit 602. The flange presses against a seal 619 that may be embodied by an O-ring. The seal further abuts against a wall formed at the border of the first section 612*a* and second section 612*b*. Thereby, no fluid can flow from the conduit 602 or channel 612 into the recess formed by the flange 604 and the inner surface of the first section 612*a* of the channel.

The inner diameter of the second section 612*b* of the channel 612 is equal to the inner diameter of the conduit 602. The center axis of the second section 612*b* of the channel 612 coincides with the center axis of the inner surface of the conduit 602. Thereby, back taper and cavities are avoided in which beverage may stagnate and thus germs may be formed and biological films may deposit. The conduit 602 may be secured by an outer threat nut within the first section 612*a* of the channel 612, wherein the first section 612*a* comprises an inner threat (not shown) engaging with the outer thread of the outer thread nut. The outer thread nut may be arranged moveable on the conduit 602 in axial direction.

The channel 612 and the inner surface of the conduit 602 may be treated by electroplating for reducing roughness of the surface. A complementary conduit may be connected to the conduit 602 by orbital welding as has been described before with reference to FIG. 2.

Figure 7:
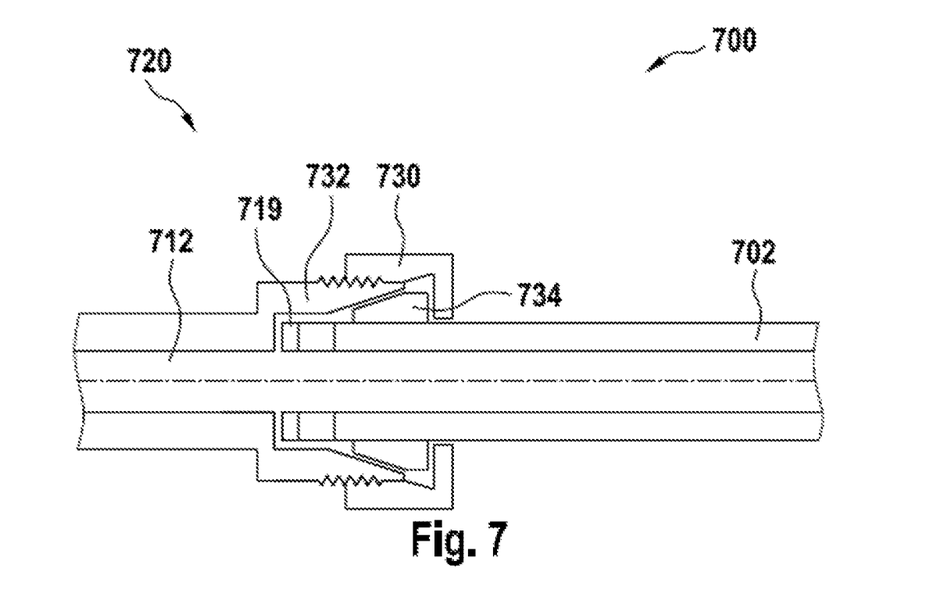
FIG. 7 shows a sixth embodiment of a coupling between a conduit and a beverage preparation device and/or a demineralization device that is based on a compression ring.

Reference is made to FIG. 7 showing a sixth embodiment of a coupling 700 between a port 720 of a beverage treatment device or a demineralization device. The coupling 700 is known for the person skilled in the art as a compression fitting. A conduit 702 is coupled with a channel 712 of the port 720 of the beverage preparation device or the mineralization device. The inner diameter of the channel 712 is equal to the inner diameter of the conduit 702. A cylindrical seal 719 is arranged between the conduit 702 and the channel 712. The port comprises a tapered section 732 in which the conduit 702 is arranged. A tapered element 734 is arranged between the tapered section 732 and the outer wall of the conduit 702. The tapered section 732 comprises an outer threat. A union nut or a coupling nut 730 comprising an inner threat engages with the outer threat of the tapered section 732 for pressing the compression ring 734 such that the tapered section of the compression ring 734 engages with the outward tapered portion of the tapered section 732. The tapered section of the compression ring 734 is located at the radial outward portion of the compression ring 734. The tapered portion of the tapered section 732 is arranged at the radially inward portion of the tapered section 732. The outer threat of the tapered section 732 is arranged at the radially outward portion of the tapered section 732.

The conduits may have an inner diameter ranging from approximately 3 mm to approximately 10 mm, preferably ranging from approximately 3 mm to approximately 8 mm.

As mentioned before, the channels 212, 312, 412, 512, 612, 712 and at least the inner surface of the conduits 202, 302, 402, 502, 602, 702 of the first to sixth embodiment may be formed by a biological inert metal, such as stainless steel, VA steel, V1A steel, V2A steel, V3A steel, V4A steel, V5A steel or the like. Such material prevents generation of biological films and germ formation. Further, it may be disinfected thermally and/or chemically without jeopardizing life expectancy of the channel, conduit and components of the water preparation devices.

As mentioned before seal 219, 319, 419, 519, 619, 719 of the first to sixth embodiment between the conduit conduits 202, 302, 402, 502, 602, 702 and at least one beverage preparation device 210, 310, 410, 510, 610, 710 and/or the mineralization device 210, 310, 410, 510, 610, 710 may be made of polytetrafluorethylene. In one embodiment the steel may be coated with polytfluoroethylene. Polyfluoroethylene (PTFE) has the advantage that it is chemical inert and biological inert. Thereby, germ formation and deposition of a biologic film can be prevented. Polyflouroethylene is commercially available as Teflon. In one embodiment the seal may be made of fluororubber also known as flourelastomer and VITON. In one embodiment the seal may be made of fluororubber coated with polytetraflouroethylene. Fluororubber is biological inert and thus preventing germ formation and deposition of a biologic film.

Figure 8:
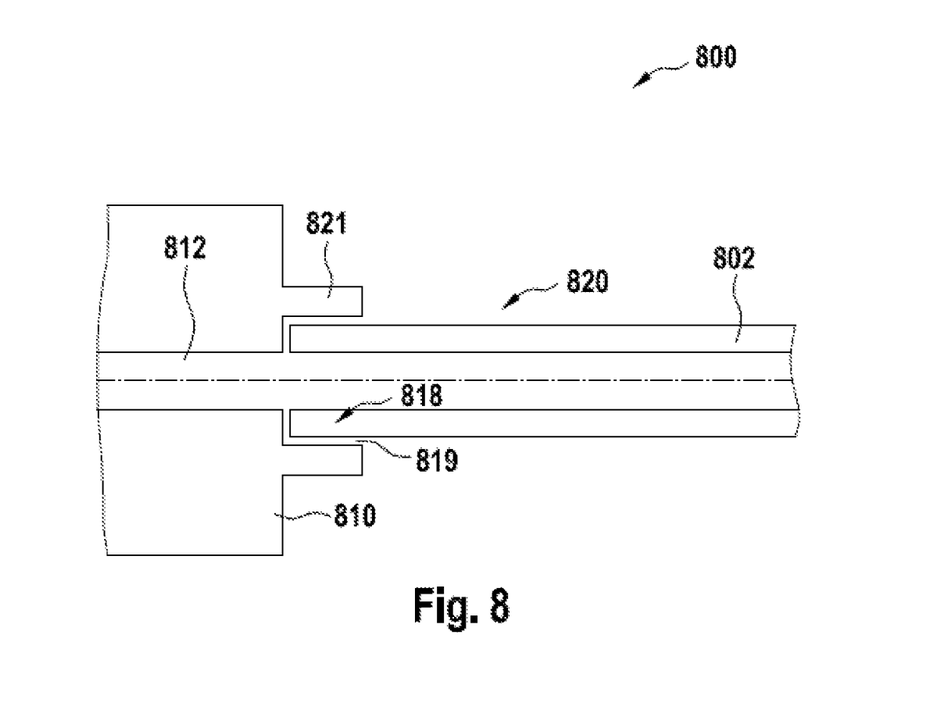
FIG. 8 shows an embodiment of a coupling between a conduit is soldered to a beverage preparation device and/or a demineralization device and/or valve.

Reference is made to FIG. 8 showing a coupling 800, in which a conduit 802 is soldered to a port 820 formed at a beverage preparation device 810, demineralization device 810 and/or a valve 810. The port 820 comprises a conduit 812 for piping beverage into or out of the beverage preparation device 810, demineralization device 810 and/or valve 810. The central axis of the conduit 802 and the channel 512 coincides. The inner diameter of the conduit 802 is equal to the inner diameter of the channel 812. A cylindrical recess 818 having a larger inner diameter as compared to the inner diameter of the conduit 802 and/or the inner diameter of the channel 812 is formed at the port 820.

The conduit 802 is partly arranged in the cylindrical recess 818. In this embodiment the portion of the conduit 802 arranged in the cylindrical recess 818 is soldered to the cylindrical recess 818, particularly by hard soldering. The soldering material 819 is distributed within the cylindrical recess 819 and seals any gap between the conduit 802 and the cylindrical recess 819.

The coupling 800 shown in FIG. 8 does not comprise any back tapper or cavities in which stagnation may occur. Thereby, germ formation, deposition of a pathologic biological film, growth of pathologic microorganisms, bacteria and viruses are prevented.

In FIG. 8 the cylindrical recess 819 is formed in a cylindrical protrusion 821 protruding from an outer wall of the beverage preparation device 810, demineralization device 810 and/or the valve 810. Such cylindrical protrusion 821 can be dispensed with, if the cylindrical recess 819 is formed in the conduit 812, wherein the cylindrical recess 819 extends from the orifice of the channel at the wall of the port 820 in inward direction into the beverage preparation device 810, the demineralization device 810 and/or the valve 810.

The present invention provides the advantage that germ formation and deposition of biological films may be prevented. This cannot be ensured with beverage dispenser of the prior art formed of plastic and having couplings comprising back tapers and cavities. Moreover, the beverage dispenser according to the present invention allows thermal and/or chemical disinfection without jeopardizing life expectancy of components of the beverage dispenser.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A beverage dispenser, comprising:
   an inlet for drawing a liquid from a source;
   an outlet for outputting a beverage to a portable user vessel;
   a demineralization device for demineralizing the liquid from the source having an input and an output, wherein the input of the demineralization device is coupled with the inlet;
   a pump causing a flow of liquid from the inlet to the outlet;
   a controller controlling the pump and at least one beverage preparation device; and
   a beverage preparation device having an input and an output, wherein the input of the beverage preparation device is coupled with the output of the demineralization device and the output of the beverage preparation device is coupled with the outlet,
   wherein the beverage preparation device, the outlet, all active components and all passive components downstream of the demineralization device contacting the beverage on every surface contacting the water consist of a biological inert material, wherein the biological inert material is selected from a list consisting of:

stainless steel; VA steel; V1A steel; V2A steel; V3A steel; V4A steel; V5A steel; titanium and combinations thereof, and wherein the controller controls the pump after a request of a user to dispense beverage such that in all beverage preparation devices an equal flow rate is achieved.

2. The beverage dispenser according to claim 1, wherein the demineralization device comprises at least one item selected from a list consisting of: a reverse osmosis filter; an ion exchanger; and a distiller, wherein the beverage preparation device includes at least one of the following:

a flow-type water preparation device; a flow-type tempering device; a flow-type carbonization device; and a flow-type mineralization device.

3. The beverage dispenser according to claim 1, wherein:

the inner diameter of a channel of an input port of at least one of the beverage preparation devices is equal to the inner diameter of the conduit connected to the input port of the beverage preparation device; and/or the inner diameter of a channel of an output port of at least one of the beverage preparation devices is equal to the inner diameter of the conduit connected to the output port of the beverage preparation device; and the inner diameter of a channel of an output port of the demineralization device is equal to the inner diameter of the conduit connected to the output port of the demineralization device.

4. The beverage dispenser according to claim 1, wherein:

a least a part of a surface of the conduit contacting the beverage is electroplated;

at least a part of a surface of the beverage preparation device contacting the beverage is electroplated;

at least a part of a surface of the demineralization device contacting the beverage is electroplated;

at least one conduit is manufactured by orbital welding;

at least one conduit is hard soldered into an opening of a port of the demineralization device; and at least one conduit is hard soldered into an opening of a port of the beverage preparation device.

5. The beverage dispenser according to claim 1, further comprising a seal between a conduit and at least one beverage preparation device and/or demineralization device, the seal made of a material selected from a list consisting of: polytetrafluorethyle; polytetrafluorethyle; fluororubber; fluororubber coated with polytetrafluorethyle and combinations thereof.

6. The beverage dispenser according to claim 1, further comprising:

a conduit coupled with at least one beverage preparation device and/or the demineralization device comprises a flange extending radially outward from the axial end of the conduit;

a channel formed in a port of the at least one beverage preparation device and/or the demineralization device for piping beverage through the at least one beverage preparation device and/or the demineralization device; and a seal located between the flange and a wall of a housing of the port of the at least one beverage preparation device and/or the demineralization device, wherein the central axis of the channel, the inner surface of the seal and the inner surface of the conduit coincide and the inner diameter of the conduit, the seal and the channel of the port comprise the same diameter.

7. The beverage dispenser according to claim 1, further comprising:

a conduit coupled with at least one beverage preparation device and/or the demineralization device comprises a flange extending radially outward from the axial end of the conduit; and a seal between the flange and a wall of a housing at a channel of a port of the at least one beverage preparation device and/or the demineralization device is located in a recess formed in at least one of the flange and the housing, wherein the central axis of the channel and the inner surface of the conduit coincide and the inner diameter of the conduit and the inner diameter of the channel of the port are equal.

8. The beverage dispenser according to claim 1, further comprising:

a port of at least one beverage preparation device and/or the demineralization device comprises a channel comprising a first section having a first diameter, a second section comprising a second diameter and a third section comprising a third diameter, wherein the first diameter is larger than the second diameter and the second diameter is larger than the third diameter, wherein the first section is located juxtaposed to an opening of the channel and the second section is located between the first section and third section;

a conduit including a flange located spaced apart from the axial end of the conduit, wherein the axial end and the flange of the conduit is inserted into the first section of the port; and a seal is located between the flange and a wall formed at the border of first section and the second section and the opening of the conduit is located juxtaposed to a wall formed at the border of the second section and third section, wherein the inner diameter of the third section is equal to the inner diameter of the conduit.

9. The beverage dispenser according to claim 1, further comprising:

a port comprising a channel having a first section having a first diameter and a second section having a second diameter is formed in a housing of at least one beverage preparation device and/or the demineralization device, wherein the first diameter is larger than the second diameter; and a conduit including a flange located spaced apart from the axial end of the conduit, wherein the axial end and the flange of the conduit is inserted into the first section of the channel, a seal is located between the flange of the conduit and a border section between the first section and second section;

wherein the inner diameter of the second section is equal to the inner diameter of the conduit and wherein the central axis of the second section and the central axis of the inner surface of the conduit coincide.

10. The beverage dispenser according to claim 1, wherein at least one conduit is connected to a port having a channel of at least one beverage preparation device and/or the demineralization device by a compression fitting.

* * * * *